United States Patent
Hirano et al.

(10) Patent No.: US 12,322,422 B1
(45) Date of Patent: Jun. 3, 2025

(54) SERVO-WRITE FOR MAGNETIC DISK MEDIA ARCHIVAL DATA STORAGE SYSTEM

(71) Applicant: Western Digital Technologies, Inc., San Jose, CA (US)

(72) Inventors: Toshiki Hirano, San Jose, CA (US); Guoxiao Guo, Irvine, CA (US); Ian R. McFadyen, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 18/596,225

(22) Filed: Mar. 5, 2024

(51) Int. Cl.
 *G11B 5/54* (2006.01)
 *G11B 5/55* (2006.01)

(52) U.S. Cl.
 CPC .................. *G11B 5/5543* (2013.01)

(58) Field of Classification Search
 CPC .... G11B 5/59633; G11B 5/59638; G11B 5/54
 USPC ................................. 360/77.02, 75
 See application file for complete search history.

(56) References Cited

U.S. PATENT DOCUMENTS

| | | | |
|---|---|---|---|
| 6,040,955 A | 3/2000 | Brown et al. | |
| 6,738,205 B1 | 5/2004 | Moran et al. | |
| 7,016,132 B2 * | 3/2006 | Sato | G11B 5/59633 360/77.02 |
| 7,133,233 B1 | 11/2006 | Ray et al. | |
| 8,482,877 B2 | 7/2013 | Akagi et al. | |
| 11,430,481 B2 | 8/2022 | Katchmart | |
| 11,682,426 B2 | 6/2023 | Hirano | |
| 11,756,583 B2 | 9/2023 | Hirano | |
| 11,810,600 B2 | 11/2023 | Hirano | |
| 2005/0264927 A1 | 12/2005 | Lai et al. | |
| 2006/0109584 A1 | 5/2006 | Chung et al. | |
| 2007/0177297 A1 | 8/2007 | Lai et al. | |
| 2023/0054813 A1 | 2/2023 | Herdendorf et al. | |
| 2023/0253013 A1 | 8/2023 | Herdendorf et al. | |

OTHER PUBLICATIONS

Sapapporn, Chaweng, Automatic Stroke Measurement on Multi Disk Writer, Asian Institute of Technology School of Engineering and Technology, May 2014, Thailand, downloaded at http://ise.ait.ac.th/wp-content/uploads/sites/57/2020/12/Automatic-Stroke-Measurement-on-Multi-Disk-Writer.pdf.

* cited by examiner

*Primary Examiner* — Nabil Z Hindi
(74) *Attorney, Agent, or Firm* — John D. Henkhaus

(57) ABSTRACT

A magnetic media library drive includes a first disk medium fixed to a spindle, a first read-write transducer configured to operate on the first disk, a second read-write transducer configured to operate on a surface of a single removable second disk medium installed over the first disk, and electronic controller circuitry configured to cause: while the first transducer is servo-positioning from a master servo pattern from the first disk, the second transducer servo-writes a product servo pattern, based on the master servo pattern, to the surface of the second disk. The removable second disk can be removed, turned over, and secured to the spindle, whereby the self-servo writing procedure can be performed on the other side of the second disk based on the master servo pattern on the first disk.

19 Claims, 6 Drawing Sheets

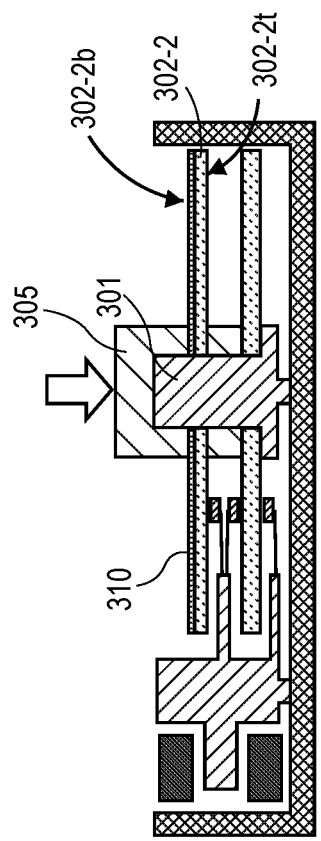
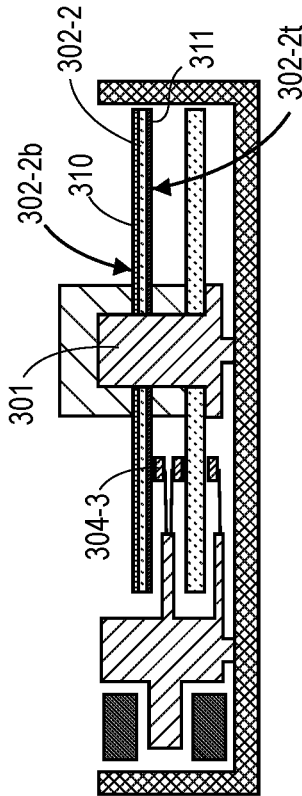
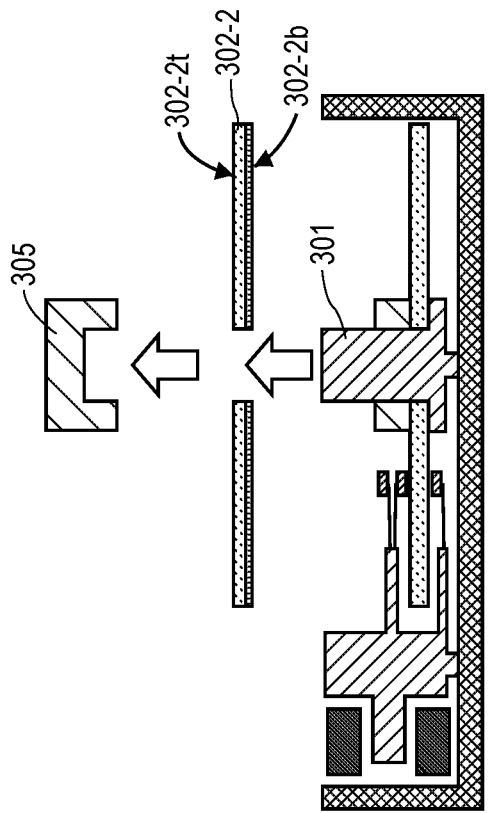
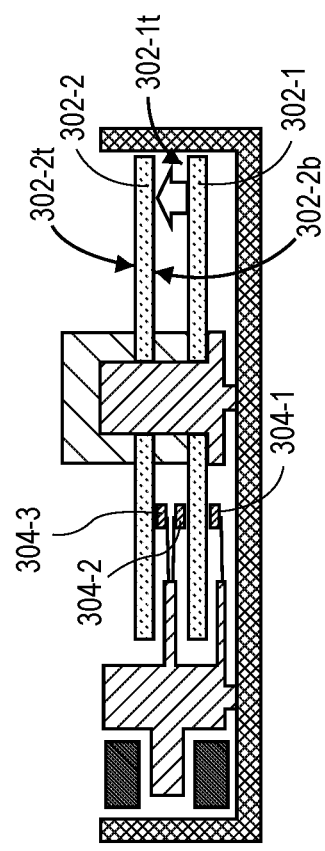
FIG. 3E
FIG. 3F
FIG. 3G
FIG. 3H

SERVO-WRITE FOR MAGNETIC DISK MEDIA ARCHIVAL DATA STORAGE SYSTEM

FIELD OF EMBODIMENTS

Embodiments of the invention may relate generally to data storage systems and, more particularly, to self-servo writing magnetic disk media in the context of an archival data storage system.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head (or "transducer") that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

There is an increasing need for archival data storage. Magnetic tape is a traditional solution for data back-up, but is notably slow in accessing the stored data. Current archives are increasingly "active" archives, meaning some level of continuing random read data access is required. There are a number of advantages that may be enabled by a magnetic disk data library over a traditional tape library, in addition to faster access time. In terms of magnetic media cost, magnetic disks in HDDs have the lowest demonstrated cost per terabyte (e.g., $/Tb). Furthermore, magnetic disks are known to have a relatively lengthy useful life, especially when maintained in a controlled environment, whereby the magnetic bits on the media will remain stable for a relatively long time.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which:

FIG. 3E is a cross-sectional side view diagram illustrating a fifth stage of the self-servo write procedure for a data storage disk media library, according to an embodiment;

FIG. 3F is a cross-sectional side view diagram illustrating a sixth stage of the self-servo write procedure for a data storage disk media library, according to an embodiment;

FIG. 3G is a cross-sectional side view diagram illustrating a seventh stage of the self-servo write procedure for a data storage disk media library, according to an embodiment;

FIG. 3H is a cross-sectional side view diagram illustrating an eighth stage of the self-servo write procedure for a data storage disk media library, according to an embodiment;

DETAILED DESCRIPTION

Figure 1:
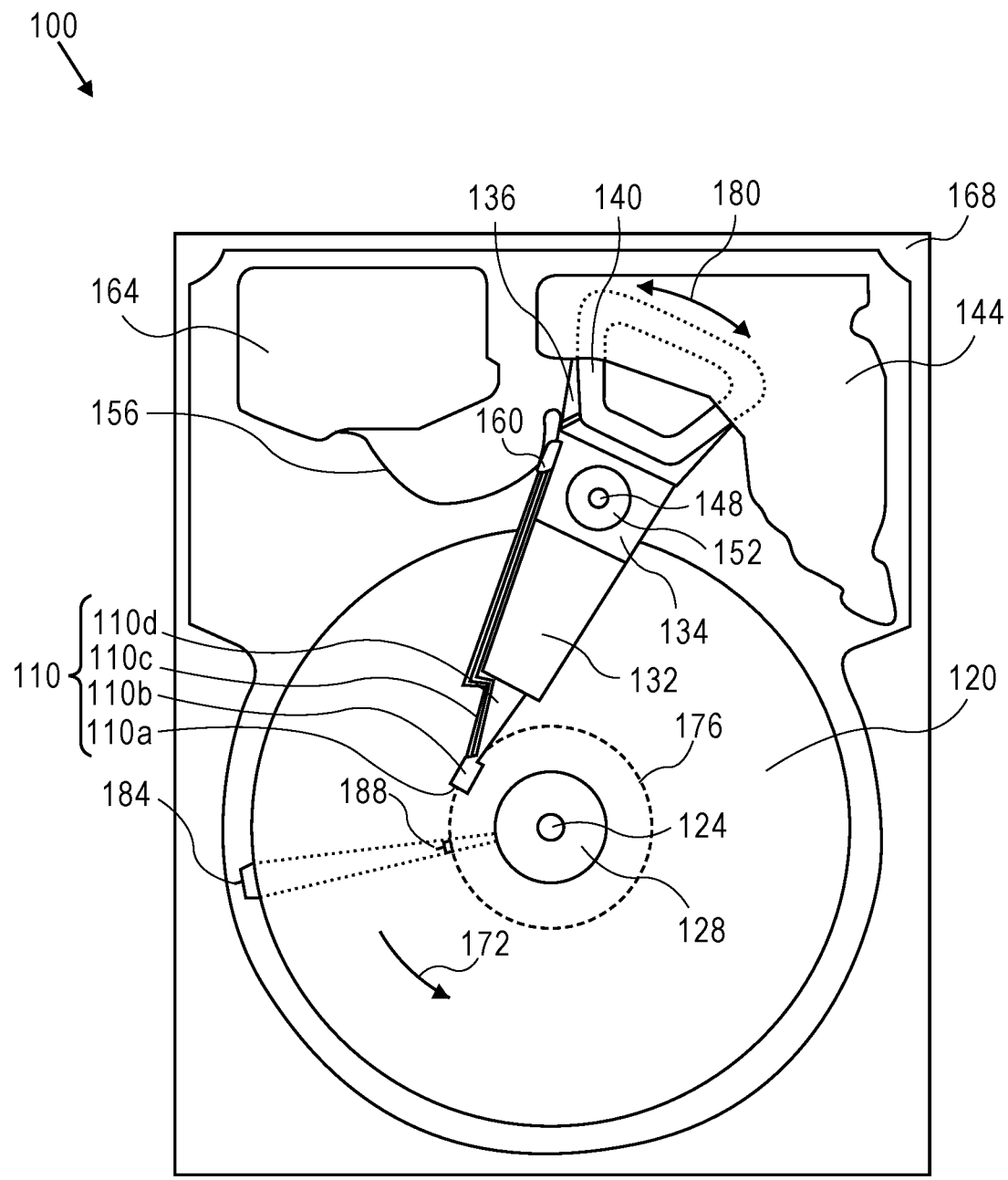
FIG. 1 is a plan view illustrating a hard disk drive (HDD), according to an embodiment.

Generally, approaches to self-servo writing in a data storage disk media library are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices may be shown in block diagram form in order to avoid unnecessarily obscuring the embodiments of the invention described herein.

INTRODUCTION

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment or to every embodiment.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

The term "hermetic" will be understood to describe a sealing arrangement designed to have nominally no (or negligible) gaseous leakage or permeation paths. While terms such as "hermetic", "negligible leakage", "no leakage", etc. may be used herein, note that such a system would often still have a certain amount of permeability and, therefore, not be absolutely leak-free. Hence, the concept of a desired or target "leak rate" may be used herein.

Context

Recall that there is a significant need for archival data storage, and that magnetic disks in hard disk drives (HDDs) have advantages over other magnetic media in the context of archival (or "cold") data storage. With respect to reducing the overall cost per byte ($/Tb) of magnetic disk-based storage systems, the costs associated with the read-write head, the mechanical structures, and the electronics might be reduced. Also, increasing the number of disks per system is another way in which to further the $/Tb cost reduction goal. Thus, a vast magnetic disk data archive system or "library" containing a significantly large number of magnetic recording disks is considered an ultimate low-cost solution to the challenges associated with archival data storage both now and into the future. This could demonstrate a faster "time to first byte" than tape (e.g., no tape winding needed and minimal read command queue wait time), with relaxed environmental requirements, and with a faster data rate than with optical disks.

Figure 2:
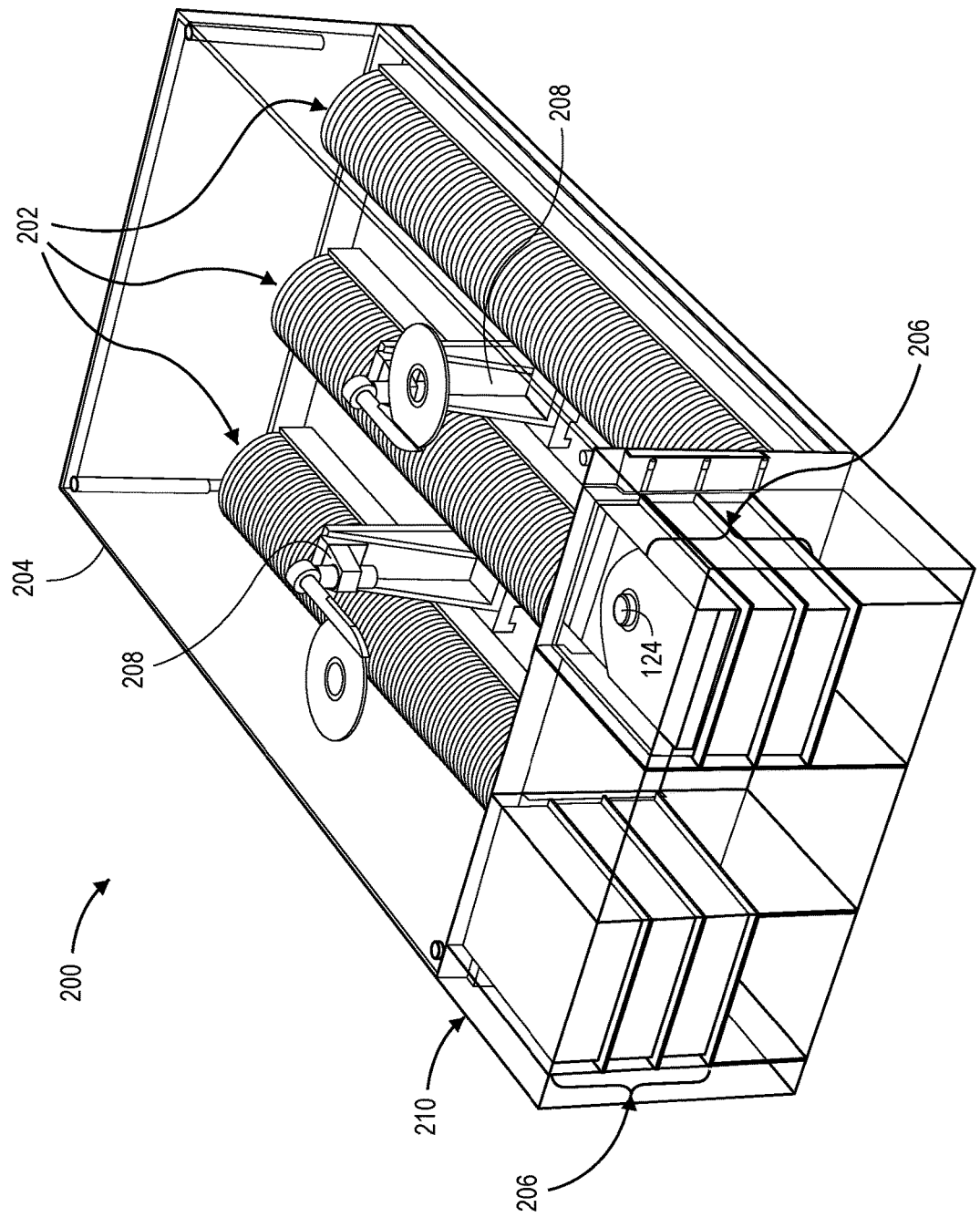
FIG. 2 is a perspective view illustrating a data storage media library, according to an embodiment.

FIG. 2 is a perspective view illustrating an archival data storage system (or "data storage library"), according to an embodiment. Data storage system 200 (or simply "storage system 200") is presented here for operational context as one non-limiting example of a magnetic disk media archival data storage system. Additional non-limiting examples are disclosed in U.S. Pat. No. 11,682,426 entitled "Archival Data Storage Library", the entire content of which is incorporated by reference for all purposes as if fully set forth herein. Furthermore, examples of read-write devices in the context of archival data storage libraries are disclosed in U.S. Pat. No. 11,810,600 entitled "Read-Write Device For An Archival Data Storage Library", the entire content of which is incorporated by reference for all purposes as if fully set forth herein.

With reference to FIG. 2, storage system 200 comprises a plurality of magnetic-recording disk media 202 (or simply "disk media 202"), such as one or more rows of disk media 202 as illustrated, at least one disk storage enclosure 204 in which the disk media 202 are housed, and at least one data storage device (DSD) 206 (referred to more particularly herein as a "read-write" device) configured to write to and to read from the disk media 202, where DSD 206 is functionally and operationally the same as or largely similar to the hard disk drive (HDD) 100 of FIG. 1. However, a DSD 206 implemented similarly to HDD 100 may be decomposed or separated into multiple separate sub-assemblies, such as a first sub-assembly comprising the disk spindle 124 (FIG. 1) and associated components on which the disk media 202 are mounted for read-write operations and a second sub-assembly comprising a head-stack assembly (HSA) (FIG. 1) and associated components for reading from and writing to the disk media 202. The sub-assemblies of such a decomposed DSD 206 may be assembled at some distance from each other (such as for disk mounting clearance purposes for a non-limiting example) and configured for operationally engaging or interlocking (e.g., by translating or rotating) when needed for performance of read-write operations. With a data storage system comprising multiple DSDs, each DSD is typically communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which would be under some degree of control by the system controller.

Storage system 200 may further comprise at least one automated disk handling mechanism 208 (e.g. a robotic machine, or robot) configured and programmed to transfer at least some of the disk media 202 between the disk storage enclosure 204 and one or more DSD 206. Additionally, storage system 200 may comprise a hermetic (or temporarily, or semi-hermetic) enclosure 210 configured for containing the disk media 202, the disk storage enclosure(s) 204, the at least one DSD 206, and the at least one disk handling mechanism 208. Thus, the hermetic enclosure 210 of this version of the storage system 200 depicted in FIG. 2 is referred to as a rack-mountable enclosure, whereby the storage system 200 can be employed in a conventional or non-conventional electronics equipment rack. Here, with storage system 200, a corresponding system controller may be further configured and programmed to communicate with and to manage and control the automated machinery, e.g., the disk handling mechanism 208, to the extent that control is not integrated directly into the automated machinery.

In the context of an HDD such as HDD 100 and/or a magnetic read-write device 300 (FIGS. 3A-3J), or more generally within a DSD such as DSD 206, a servo pattern is a magnetic pattern written on each magnetic disk media and which is utilized to generate position feedback signals. Accurate read-write head positioning (both radial and circumferential) is measured by reading such servo pattern(s) by the reader. Thus, this information is critical for the operation of an HDD because location of the stored data is defined by the servo pattern, which effectively defines the data tracks on a given magnetic recording disk. Each servo sector or "wedge" typically contains the following fields: (i) a preamble for gain control and phase acquisition, (ii) a sync mark or "servo address mark" (SAM) for synchronization (i.e., a timing reference), (iii) gray code for wedge identification (ID) for wedge count in revolution and track identification (ID) for track count in stroke, and (iv) burst fields for precision control between track IDs. In typical HDD production, after a blank disk is manufactured and installed within an HDD one of the first processes performed is the servo-write process, whereby the servo pattern is written on the disk surface. One approach to servo-writing is to use a self-servo writing ("SSW") procedure, which generates timing and positioning information from a previously written track using its own internal read-write element (or "transducer").

Self-Servo Writing in a Data Storage Disk Media Library Device

In the context of a disk media library for data storage (e.g., a "data storage system" or "data storage library", such as for archival data storage), a single-head (bottom head only) read-write device is preferred for each media library drive, e.g., for maximum cost reduction, cost saving purposes. However, some of the known self-servo writing processes may require at least two read-write heads. Thus, according to an embodiment, a three-head read-write device is implemented and employed as a media library drive such as for a data storage library. Note that such a three-head read-write device is preferably implemented only for "data-write" device (e.g., read and write capable) in such a data storage library, whereas a "data-read" device (read capable only) may employ a single-head read-write device. As such, a mixture of "data-read" and "data-write" devices may be employed in a given data storage library. However, consideration is given to an embodiment in which a two-head read-write device is employed, as described in more detail elsewhere herein.

FIGS. 3A-3J are cross-sectional side view diagrams illustrating a self-servo write procedure for a data storage disk media library, all according to embodiments. For context, a three-head media library drive (or "magnetic read-write device") configured for implementing and performing the self-servo write procedure of FIGS. 3A-3J may comprise a first magnetic disk medium fixed to a disk spindle, a first head slider coupled with a first arm and housing a first read-write transducer configured to read from and to write to the bottom surface of the first disk medium, a second head slider coupled with a second arm and housing a second read-write transducer configured to read from and to write to a top surface of the first disk medium, a third head slider coupled with the second arm and housing a third read-write transducer configured to read from and to write to a bottom surface of a removable second magnetic disk medium, and an actuator configured to move the head sliders to access portions of the disk media. According to an embodiment, such a read-write device may further comprise electronic controller circuitry storing or accessing one or more sequences of instructions which, when executed by one or more processors, cause performance of at least some of the actions described in reference to the diagrams of FIGS. 3A-3J and/or in the flow diagram of FIG. 4. The foregoing is the drive configuration generally depicted in FIGS. 3A-3J, for purposes of a non-limiting example.

Alternatively, a two-head media library drive (or "magnetic read-write device") configured for implementing and performing a self-servo write procedure may comprise only two head sliders and corresponding read-write transducers. As such, a media library drive may comprise a first magnetic disk medium fixed to a disk spindle, a first head slider housing a first read-write transducer configured to at least read from the first disk medium, a second head slider housing a second read-write transducer configured to read from and to write to a bottom surface or a top surface of a removable second magnetic disk medium, and an actuator configured to move the head sliders to access portions of the disk media. According to an embodiment, such a read-write device may further comprise electronic controller circuitry storing or accessing one or more sequences of instructions which, when executed by one or more processors, cause performance of at least some of the actions similar to as described in reference to the diagrams of FIGS. 3A-3J and/or in the flow diagram of FIG. 4. In such a configuration, the first and second head sliders may be coupled with the same actuator arm as depicted, whereby both head sliders would be positioned between the first and second disks. However, the first and second head sliders may be coupled with different actuator arms, one positioned below the first disk and one positioned between the first and second disks. As is alternatively described, the number and position of head sliders and corresponding read-write transducers may vary from implementation to implementation. As such, while a three-head drive is illustrated and primarily described in reference to FIGS. 3A-3J, implementations may comprise greater than or fewer than three head sliders and corresponding read-write transducers.

Figure 3A:
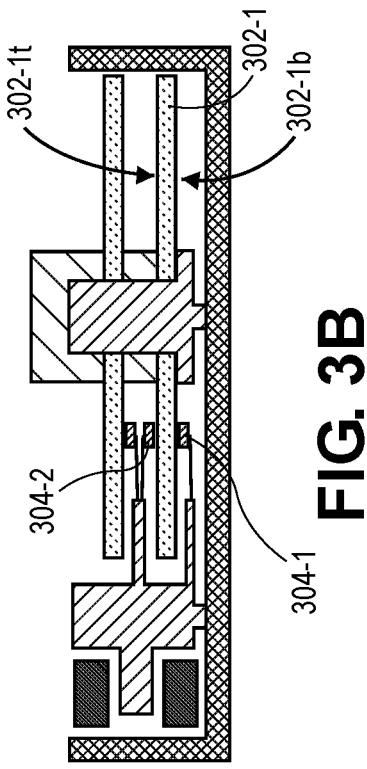
FIG. 3A is a cross-sectional side view diagram illustrating a first stage of a self-servo write procedure for a data storage disk media library, according to an embodiment.

FIG. 3A depicts a "new" media library drive installed in a magnetic media library data storage system. Disk media library drive 300 (or "read-write device 300") comprises a first magnetic disk medium 302-1 fixed to a disk spindle 301, a first head slider 304-1 coupled with a first arm 303-1 and housing a first read-write transducer configured to read from and to write to the bottom surface 302-1$b$ of the first disk medium 302-1, a second head slider 304-2 coupled with a second arm 303-2 and housing a second read-write transducer configured to read from and to write to a top surface 302-1$t$ of the first disk medium 302-1, a third head slider 304-3 coupled with the second arm 303-2 and housing a third read-write transducer configured to read from and to write to a bottom surface 302-2$b$ of a removable second magnetic disk medium 302-2, and an actuator 306 configured to move the head sliders 304-1, 304-2, 304-3 to access portions of the corresponding disk media 302-1, 302-2. Note here that the bottom first disk 302-1 is fixed or pre-fixed to the spindle 301, and that the top second disk 302-2 is a singular removable and replaceable recording disk.

Figure 3B:
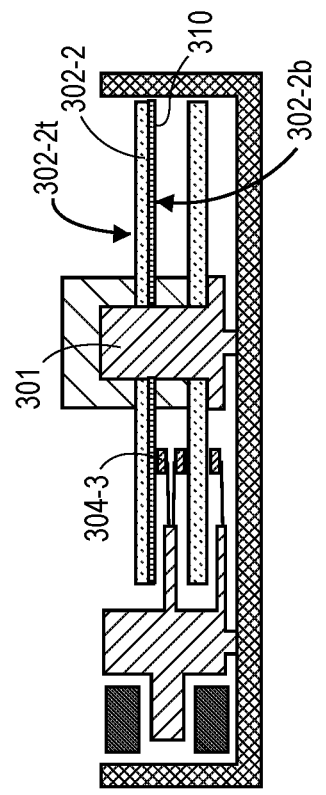
FIG. 3B is a cross-sectional side view diagram illustrating a second stage of the self-servo write procedure for a data storage disk media library, according to an embodiment.

FIG. 3B is a cross-sectional side view diagram illustrating a second stage of the self-servo write procedure for a data storage disk media library, according to an embodiment. Here, a master servo pattern (may also be referred to as self-servo writing "seed spirals") is written to the bottom disk 302-1 utilizing the first head slider 304-1 (and corresponding read-write transducer) and the second head slider 304-2 (and corresponding read-write transducer), according to self-servo write technique(s) known in the art, such as a self-seeded servo write procedure. For example, (i) an "open-loop bootstrap spiral" is written by second head slider 304-2 to the top surface 302-1$t$ of the fixed bottom disk 302-1, (ii) a "closed-loop bootstrap spiral" is written to each of the top surface 302-1$t$ and the bottom surface 302-1$b$ of the fixed bottom disk 302-1, by the second head slider 304-2 and the first head slider 304-1, respectively, and (iii) a "final spiral" and (iv) a "master concentric" is written by the second head slider 304-2 to the top surface 302-1$t$ of the fixed bottom disk 302-1. Alternatively, in the context of a two-head media library drive, a master servo pattern may be written by the first head slider 304-1 and corresponding read-write transducer to only one of the two surfaces of the fixed bottom disk 302-1. However, a servo pattern written with utilization of two heads onto both surfaces of disk 302-1 (e.g., including the closed-loop bootstrap spirals) is considered more accurate and more robust than a servo pattern written with a single head to a single surface of disk 302-1, especially in the context of copying the servo pattern to a second disk which is likely to vibrate differently than the disk on which the master servo pattern is written. Alternatively and according to an embodiment, the bottom disk 302-1 that is fixed to the spindle 301 of the read-write device 300 may be pre-written with the master servo pattern prior to installation into read-write device 300 (e.g., off-line with a dedicated servo-writer machine), i.e., the FIG. 3B stage may be foregone.

Figure 3C:
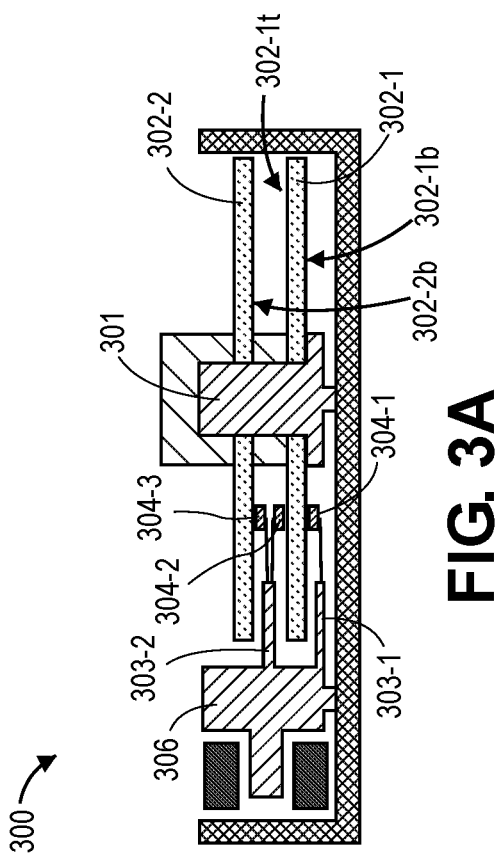
FIG. 3C is a cross-sectional side view diagram illustrating a third stage of the self-servo write procedure for a data storage disk media library, according to an embodiment.

FIG. 3C is a cross-sectional side view diagram illustrating a third stage of the self-servo write procedure for a data storage disk media library, according to an embodiment.

Here, while the second head slider 304-2 is servo-positioning from the master servo pattern from the top surface 302-1*t* of the bottom disk 302-1, the third head slider 304-3 is servo-writing a product servo pattern, based on the master servo pattern, to the bottom surface 302-2*b* of the (top) second disk 302-2. For example, the second head slider 304-2 servo-positions from the "master concentric" on the top surface 302-1*t* of the bottom disk 302-1, the spiral servo patterns from the top surface 302-1*t* of the bottom disk 302-1 are effectively "copied" to the third head slider 304-3 (i.e., via servo-controller electronics), and the third head slider 304-3 servo-writes a "product" servo pattern (i.e., final servo pattern used for operational purposes), based on the master servo pattern read from the bottom disk 302-1, to the bottom surface 302-2*b* of the (top) second disk 302-2. Therefore, the bottom surface 302-2*b* of the top disk 302-2 is now configured for the writing of user data. Alternatively, with a media library drive in which the third head slider 304-3 has operational access to the top surface 302-2*t* of the second disk 302-2 rather than the bottom surface 302-2*b* of the second disk 302-2 (i.e., the third head slider 304-3 is positioned differently than in FIG. 3C), the third head slider 304-3 servo-writes the product servo pattern based on the master servo pattern to the top surface 302-2*t* of the (top) second disk 302-2 and the top surface 302-2*t* of the top disk 302-2 would now be configured for the writing of user data.

Figure 3D:
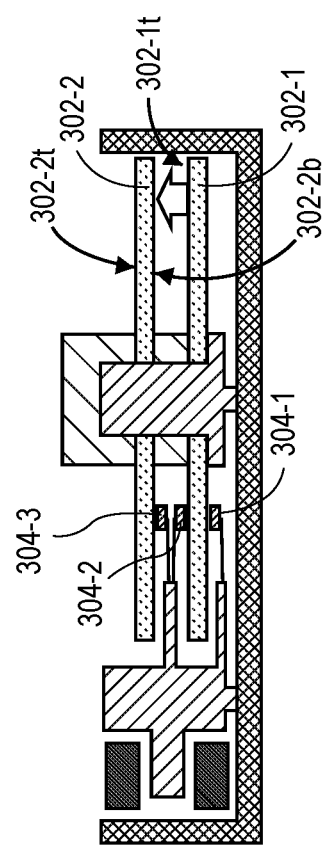
FIG. 3D is a cross-sectional side view diagram illustrating a fourth stage of the self-servo write procedure for a data storage disk media library, according to an embodiment.

FIG. 3D is a cross-sectional side view diagram illustrating a fourth stage of the self-servo write procedure for a data storage disk media library, according to an embodiment. Optionally, user data 310 (i.e., non-servo pattern data) can now be written by the third head slider 304-3 to the bottom surface 302-2*b* of the top disk 302-2. Alternatively, continuing with the example media library drive in which the third head slider 304-3 has operational access to the top surface 302-2*t* of the second disk 302-2 rather than the bottom surface 302-2*b* of the second disk 302-2, user data 310 can now be written by the third head slider 304-3 to the top surface 302-2*t* of the top disk 302-2. Alternatively and according to an embodiment, the top disk 302-2 may now be removed from the spindle 301, e.g., by an automated robotic machine or arm such as automated disk handling mechanism 208 (FIG. 2), and placed in a disk storage location such as disk storage enclosure 204 (FIG. 2). However, writing user data to top disk 302-2 "immediately" after writing the servo pattern is preferred, i.e., without first removing disk 302-2 from spindle 301, as the servo pattern remains concentric with the spindle if disk 302-2 is not removed.

FIG. 3E is a cross-sectional side view diagram illustrating a fifth stage of the self-servo write procedure for a data storage disk media library, according to an embodiment. According to an embodiment, the top disk 302-2 may now be removed from the spindle 301, e.g., by automated disk handling mechanism 208 (FIG. 2), such as by removing a removable disk clamp 305. Approaches to removable disk clamps in the context of a read-write device for archival data storage libraries are disclosed in U.S. Pat. No. 11,756,583 entitled "Removable Disk Clamp For Read-Write Device In Archival Data Storage Library", the entire content of which is incorporated by reference for all purposes as if fully set forth herein.

FIG. 3F is a cross-sectional side view diagram illustrating a sixth stage of the self-servo write procedure for a data storage disk media library, according to an embodiment. According to an embodiment, the top disk 302-2 may now be turned over and again removably secured to the spindle 301 such that an opposing second surface of the second disk medium is now facing bottom disk 302-1, e.g., top surface 302-2*t* which is now physically a bottom surface after being turned over, e.g., by automated disk handling mechanism 208. Continuing with the alternative example involving the third head slider 304-3*b* being positioned over the second disk 302-2 rather than under, the third head slider 304-3 would now have operational access to the now-top surface 302-2*b* of the second disk 302-2. Alternatively, in the context of a media drive in which there are head sliders corresponding to both the first surface 302-2*b* and the opposing surface 302-2*t* of the second disk medium 302-2, the second disk medium 302-2 would not need to be turned over.

FIG. 3G is a cross-sectional side view diagram illustrating a seventh stage of the self-servo write procedure for a data storage disk media library, according to an embodiment. Similarly as with the stage of FIG. 3C, while the second head slider 304-2 is servo-positioning from the master servo pattern from the top surface 302-1*t* of the bottom disk 302-1, the third head slider 304-3 is servo-writing a product servo pattern, based on the master servo pattern, to the now-bottom surface 302-2*t* of the (top) second disk 302-2. Therefore, the now-bottom surface 302-2*t* of the top disk 302-2 is now configured for the writing of user data. Alternatively, with a media library drive in which the third head slider 304-3 has operational access to the now-top surface 302-2*b* of the second disk 302-2, the third head slider 304-3 servo-writes the product servo pattern based on the master servo pattern to the now-top surface 302-2*b* of the (top) second disk 302-2 and the now-top surface 302-2*b* of the top disk 302-2 would now be configured for the writing of user data.

FIG. 3H is a cross-sectional side view diagram illustrating an eighth stage of the self-servo write procedure for a data storage disk media library, according to an embodiment. Similarly as with the stage of FIG. 3D, optionally, user data 311 (i.e., non-servo pattern data) can now be written by the third head slider 304-3 to the now-bottom surface 302-2*t* of the top disk 302-2. As noted before, writing user data to top disk 302-2 "immediately" after writing the servo pattern is preferred because the servo pattern remains concentric with the spindle if disk 302-2 is not removed. Continuing with the alternative example involving the third head slider 304-3 being positioned over the second disk 302-2 rather than under, user data 311 can now be written by the third head slider 304-3 to the now-top surface 302-2*b* of the top disk 302-2.

Figure 3I:
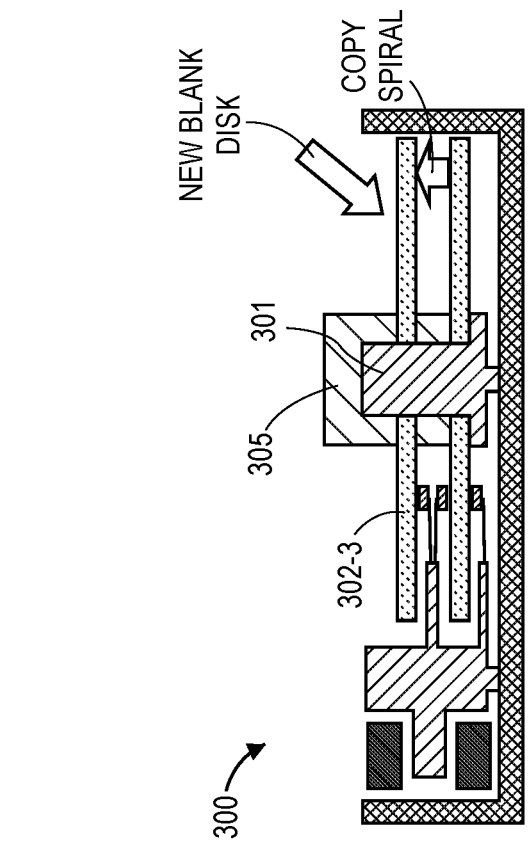
FIG. 3I is a cross-sectional side view diagram illustrating a ninth stage of the self-servo write procedure for a data storage disk media library, according to an embodiment.

FIG. 3I is a cross-sectional side view diagram illustrating a ninth stage of the self-servo write procedure for a data storage disk media library, according to an embodiment. Here, whether or not user data 311 has been written (FIG. 3H), the top disk 302-2 may now be removed from the spindle 301, e.g., such as by automated disk handling mechanism 208 removing the removable disk clamp 305, and placed in a disk storage location such as disk storage enclosure 204. As described elsewhere herein and according to an embodiment, the bottom disk 303-1 is fixed to the spindle 301 and is preferably not removable as is the top disk 302-2 or any other second disk used in read-write device 300 of a media library data storage system.

Figure 3J:
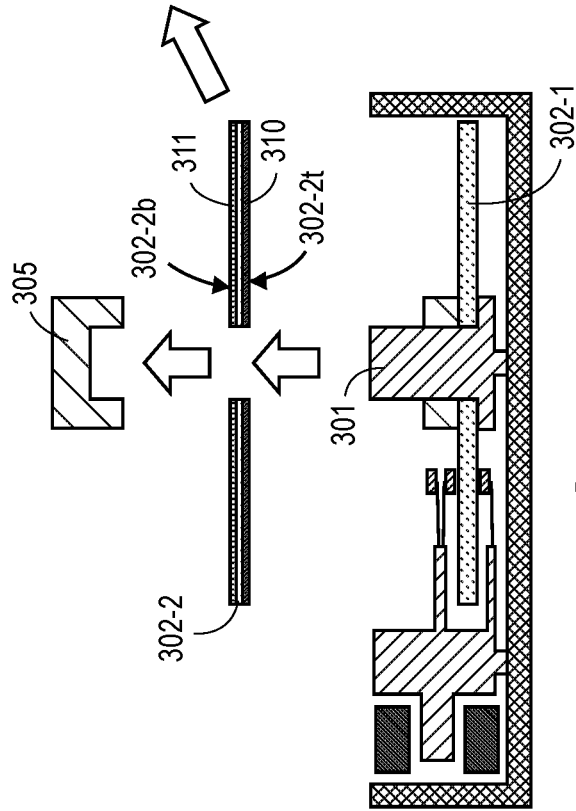
FIG. 3J is a cross-sectional side view diagram illustrating a tenth stage of the self-servo write procedure for a data storage disk media library, according to an embodiment.

FIG. 3J is a cross-sectional side view diagram illustrating a tenth stage of the self-servo write procedure for a data storage disk media library, according to an embodiment. As implied above, here, a new blank disk 302-3 may be secured by removable clamp 305 onto the spindle 301 of read-write device 300, whereby the stages corresponding to FIGS. 3B-3J may be repeated on an essentially unlimited number of new blank disks such as disk 302-3.

Method of Self-Servo Writing in a Disk Media Storage Device

Figure 4:
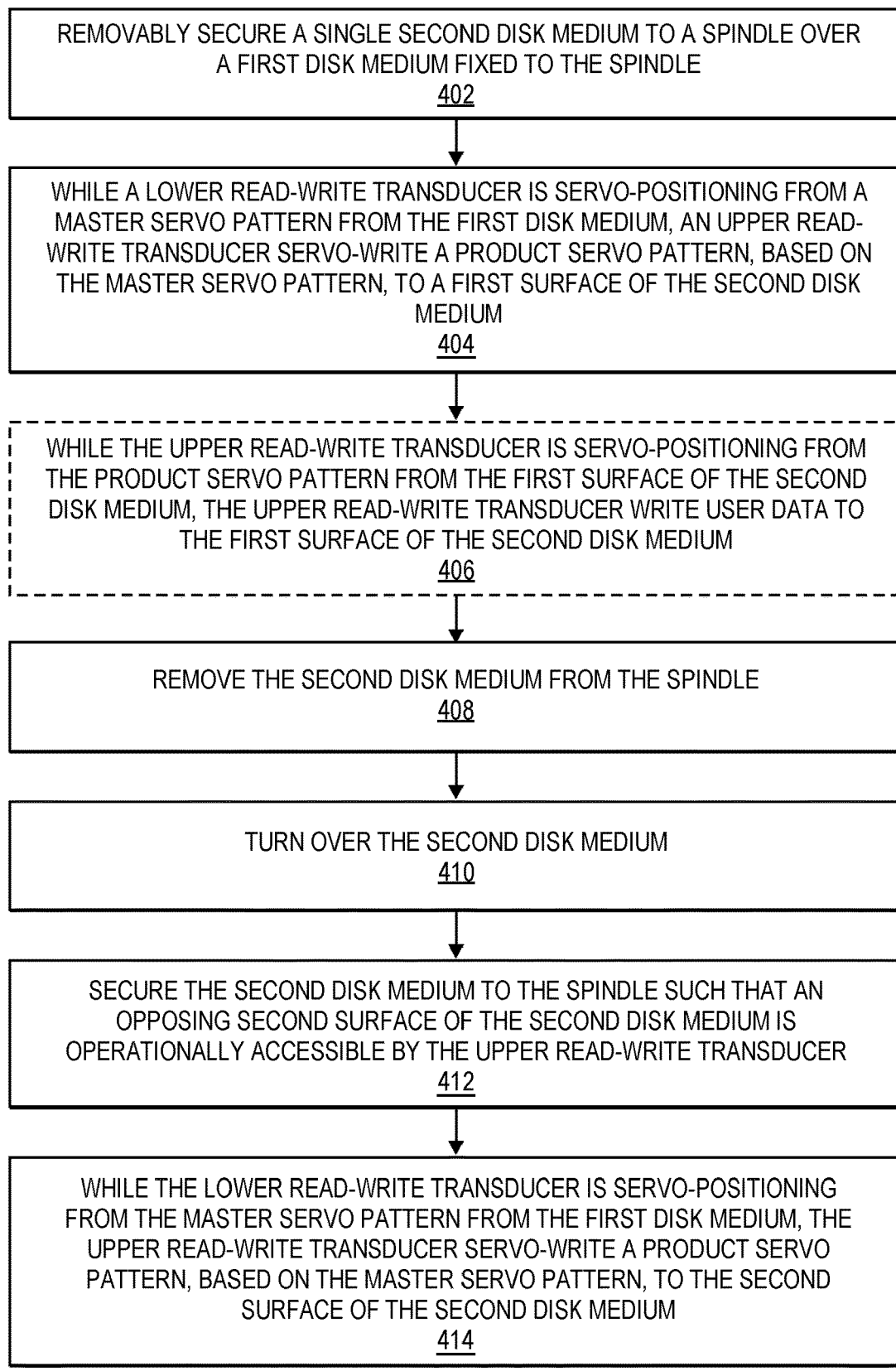
FIG. 4 is a flow diagram illustrating a method of self-servo writing in a disk media storage device, according to an embodiment.

FIG. 4 is a flow diagram illustrating a method of self-servo writing in a disk media storage device, according to an embodiment. Example uses include operating read-write device 300 (see, e.g., FIG. 3A) in the rack-mountable data storage system 200 of FIG. 2, and/or in other generally similarly configured data storage systems, in which a first disk medium is rotatably fixed to a spindle, as described hereafter. The method of FIG. 4 may also be implemented for use in a two-head media drive, whereby the master servo pattern is written and read from only one surface of the bottom first disk medium.

At block 402, removably secure a single second disk medium to the spindle over the first disk medium. For example, a top second disk medium, disk 302-2 (see, e.g., FIGS. 3A-3B) is removably secured to spindle 301 (see, e.g., FIG. 3A) over the bottom first disk medium, disk 302-1 (see, e.g., FIGS. 3A-3B).

At block 404, while a lower read-write transducer is servo-positioning from a master servo pattern from the first disk medium, an upper read-write transducer servo-writing a product servo pattern, based on the master servo pattern, to a first surface of the second disk medium. For example, while second head slider 304-2 (see, e.g., FIG. 3C) housing a second read-write transducer is servo-positioning from a master servo pattern from the top surface 302-1*t* (see, e.g., FIG. 3C) of disk 302-1, a third head slider 304-3 (see, e.g., FIG. 3C) housing a third read-write transducer servo-writes a product servo pattern (i.e., final servo pattern used for operational purposes), based on the master servo pattern read from the bottom disk 302-1, to the bottom surface 302-2*b* (see, e.g., FIG. 3C) (or the top surface 302-2*t* if the media drive is so alternatively configured as described elsewhere herein) of disk 302-2. The bottom surface 302-2*b* (or top surface 302-2*t*) of the top disk 302-2 is now configured and provisioned for the writing of user data (i.e., non-servo pattern data). According to an embodiment, optionally, the top disk 302-2 may now be removed from the spindle 301, e.g., by an automated robotic machine or arm such as automated disk handling mechanism 208 (FIG. 2), and placed in a disk storage location such as disk storage enclosure 204 (FIG. 2).

At optional (depicted as dashed box) block 406, according to an embodiment (see, e.g., FIG. 3D), while the upper read-write transducer corresponding to the third head slider 304-3 is servo-positioning from the product servo pattern from the bottom surface 302-2*b* of disk 302-2, the upper read-write transducer of third head slider 304-3 also writes user data 310 (i.e., non-servo pattern data) to the bottom surface 302-2*b* (or the top surface 302-2*t* if the media drive is so alternatively configured as described elsewhere herein) of disk 302-2.

At block 408, the second disk medium is removed from the spindle. For example, disk 302-2 is removed from spindle 301 (see, e.g., FIG. 3E), such as by removing a removable disk clamp 305 (FIG. 3E) such as by automated disk handling mechanism 208 (FIG. 2). According to an embodiment, optionally, disk 302-2 may now be placed in a disk storage location, such as disk storage enclosure 204. However, at block 410 and according to an embodiment, the second disk medium is turned over. For example, disk 302-2 is turned over, such as by automated disk handling mechanism 208 (FIG. 2).

At block 412, the second disk medium is secured to the spindle such that an opposing second surface of the second disk medium is operationally accessible by the upper read-write transducer. For example, the top disk 302-2 is again removably secured to the spindle 301 such that an opposing second surface of the second disk medium is now facing bottom disk 302-1 (see, e.g., FIG. 3F), e.g., top surface 302-2*t* which is now physically a bottom surface after being turned over at block 410. In the context of the alternative embodiment in which the third head slider 304-3 is positioned over the second disk 302-2 rather than under, the opposing second surface of the second disk medium is now-top surface 302-2*b* which is now physically a top surface after being turned over at block 410. Alternatively, in the context of a media drive in which there are head sliders corresponding to both the first surface 302-2*b* and the opposing surface 302-2*t* of the second disk medium 302-2, the second disk medium 302-2 would not need to be removed at block 408, turned over at block 410, and/or resecured to the spindle at block 412.

At block 414, while the lower read-write transducer is servo-positioning from the master servo pattern from the first disk medium, the upper read-write transducer servo-writing a product servo pattern, based on the master servo pattern, to the second surface of the second disk medium. For example, while second head slider 304-2 housing a second read-write transducer is servo-positioning from the master servo pattern from the top surface 302-1*t* of disk 302-1, the third head slider 304-3 housing a third read-write transducer servo-writes a product servo pattern, based on the master servo pattern read from the bottom disk 302-1, to the now-bottom surface 302-2*t* (or the now-top surface 302-2*b* if the media drive is so alternatively configured as described elsewhere herein) of disk 302-2 (see, e.g., FIG. 3G). The now-bottom surface 302-2*t* (or now-top surface 302-2*b*) of the top disk 302-2 is now configured and provisioned for the writing of user data. According to an embodiment, optionally, the top disk 302-2 may now be removed from the spindle 301 and placed in a disk storage location such as disk storage enclosure 204 (FIG. 2).

As with optional block 406, optionally here also, while the upper read-write transducer corresponding to the third head slider 304-3 is servo-positioning from the product servo pattern from the now-bottom surface 302-2*t* (or now-top surface 302-2*b*) of disk 302-2, the upper read-write transducer of third head slider 304-3 also writes user data 311 (i.e., non-servo pattern data) to the now-bottom surface 302-2*t* (or now-top surface 302-2*b*) of disk 302-2 (see, e.g., FIG. 3H).

As with FIG. 3I, here also, whether or not user data 311 has been written, the top disk 302-2 may now be removed from the spindle 301, e.g., such as by automated disk handling mechanism 208 removing the removable disk clamp 305, and placed in a disk storage location such as disk storage enclosure 204. Furthermore and as with FIG. 3J, a new blank disk 302-3 may be secured by removable clamp 305 onto the spindle 301 of read-write device 300, whereby blocks 404-414 may be repeated on an essentially unlimited number of new blank disks such as disk 302-3.

In view of the foregoing description, a three-head HDD may be implemented and employed as a media library drive such as for a data storage library, where such a three-head HDD may be employed for write-only HDDs in such a data storage library,

Physical Description of an Illustrative Operating Context

Embodiments may be implemented in the context of digital data storage devices (DSDs) such as hard disk drive (HDDs) or modified HDDs. Thus, in accordance with an embodiment, a plan view illustrating a conventional HDD 100 is shown in FIG. 1 to aid in describing how a conventional HDD typically operates.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable", or "flexible printed circuit" (FPC)). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alpha-numeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A magnetic read-write device comprising:
a first magnetic disk medium rotatably fixed to a disk spindle;
a first head slider housing a first read-write transducer configured to read from the first magnetic disk medium;
a second head slider housing a second read-write transducer configured to read from and to write to a single removable second magnetic disk medium;
an actuator configured to move the head sliders to access portions of the respective first and second magnetic disk medium; and
electronic controller circuitry storing or accessing one or more sequences of instructions which, when executed by one or more processors, cause performance of:
while the first read-write transducer is servo-positioning from a master servo pattern from the first magnetic disk medium, the second read-write transducer servo-writing a product servo pattern, based on the master servo pattern, to the second magnetic disk medium; and
after the second magnetic disk medium is turned over and removably secured to the disk spindle such that an opposing surface of the second magnetic disk medium is operationally accessible by the second read-write transducer, while the first read-write transducer is servo-positioning from the master servo pattern from the first magnetic disk medium, the second read-write transducer servo-writing a product servo pattern to the opposing surface of the second magnetic disk medium.

2. The magnetic read-write device of claim 1, wherein the one or more sequences of instructions, when executed by the one or more processors, cause further performance of:
while the second read-write transducer is servo-positioning from the product servo pattern from a surface of the second magnetic disk medium, the second read-write transducer writing user data to the surface of the second magnetic disk medium.

3. The magnetic read-write device of claim 1, wherein the one or more sequences of instructions, when executed by the one or more processors, cause further performance of:
while the second read-write transducer is servo-positioning from the product servo pattern from the second magnetic disk medium, the second read-write transducer writing user data to the opposing surface of the second magnetic disk medium.

4. The magnetic read-write device of claim 1, wherein the one or more sequences of instructions, when executed by the one or more processors, cause further performance of:
after a third magnetic disk medium is removably secured to the disk spindle over the first magnetic disk medium, while the first read-write transducer is servo-positioning from the master servo pattern from the first magnetic disk medium, the second read-write transducer servo-writing a product servo pattern, based on the master servo pattern, to the third magnetic disk medium.

5. The magnetic read-write device of claim 1, wherein the one or more sequences of instructions, when executed by the one or more processors, cause further performance of:
the first read-write transducer self-servo writing the master servo pattern onto the first magnetic disk medium.

6. The magnetic read-write device of claim 1, wherein the one or more sequences of instructions, when executed by the one or more processors, cause further performance of:
while the first read-write transducer is servo-positioning from the master servo pattern from the first magnetic disk medium, a third read-write transducer servo-writing a product servo pattern, based on the master servo pattern, to an opposing surface of a third magnetic disk medium, which replaced the second magnetic disk medium, from that which the second read-write transducer is servo-writing.

7. The magnetic read-write device of claim 1, wherein the first head slider and the second head slider are the only head sliders constituent to the magnetic read-write device.

8. A data storage library comprising the magnetic read-write device of claim 1.

9. A method of self-servo writing in a disk media storage device comprising a first disk medium fixed to a spindle, the method comprising:
removably securing a single second disk medium to the spindle over the first disk medium;
while a lower read-write transducer is servo-positioning from a master servo pattern from the first disk medium, an upper read-write transducer servo-writing a product servo pattern, based on the master servo pattern, to a first surface of the second disk medium;
removing the second disk medium from the spindle;
turning over the second disk medium;
removably securing the second disk medium to the spindle such that an opposing second surface of the second disk medium is operationally accessible by the upper read-write transducer; and while the lower read-write transducer is servo-positioning from the master servo pattern from the first disk medium, the upper read-write transducer servo-writing a product servo pattern, based on the master servo pattern, to the second surface of the second disk medium.

10. The method of claim 9, further comprising:
while the upper read-write transducer is servo-positioning from the product servo pattern from the first surface of the second disk medium, the upper read-write transducer writing user data to the first surface of the second disk medium.

11. The method of claim 10, further comprising:
while the upper read-write transducer is servo-positioning from the product servo pattern from the second surface of the second disk medium, the upper read-write transducer writing user data to the second surface of the second disk medium.

12. The method of claim 11, further comprising:
removing the second disk medium from the spindle; and
placing the second disk medium in a disk storage location.

13. The method of claim 9, further comprising:
while the lower read-write transducer is servo-positioning from the master servo pattern from the first disk medium, a third read-write transducer servo-writing a product servo pattern, based on the master servo pattern, to an upper surface of a third disk medium that replaced the second disk medium.

14. The method of claim 9, further comprising:
removing the second disk medium from the spindle;
removably securing a third disk medium to the spindle over the first disk medium; and
while the lower read-write transducer is servo-positioning from the master servo pattern from the first disk medium, the upper read-write transducer servo-writing a product servo pattern, based on the master servo pattern, to a first surface of the third disk medium.

15. The method of claim 9, further comprising:
self-servo writing the master servo pattern onto the first disk medium.

16. The method of claim 9, wherein removably securing the second disk medium to the spindle includes removably securing a blank second disk medium.

17. A magnetic media data storage library comprising:
a plurality of magnetic disk media;
at least one disk storage area in which the disk media are housed;
at least one read-write device (RWD) configured to write to and read from the disk media, the at least one RWD comprising:
a first magnetic disk medium, of the plurality of magnetic disk media, fixed to a disk spindle,
a first head slider housing a first read-write transducer configured to read from the first magnetic disk medium,
a second head slider housing a second read-write transducer configured to read from and to write to a surface of a removable second magnetic disk medium of the plurality of magnetic disk media,
electronic controller circuitry storing or accessing one or more sequences of instructions which, when executed by one or more processors, cause performance of:
while the first read-write transducer is servo-positioning from a master servo pattern from the first magnetic disk medium, the second read-write transducer servo-writing a product servo pattern, based on the master servo pattern, to the surface of the second magnetic disk medium, and
means for moving the head sliders to access portions of the disk media; and
one or more automated disk handling mechanisms configured to:
transfer the second magnetic disk medium between the disk storage area and the at least one RWD; and
turn over and removably secure the second magnetic disk medium to the disk spindle;
wherein the one or more sequences of instructions, when executed by the one or more processors, cause further performance of:
after the second magnetic disk medium is secured to the disk spindle such that an opposing surface of the second magnetic disk medium is operationally accessible by the second read-write transducer, while the first read-write transducer is servo-positioning from the master servo pattern from the first magnetic disk medium, the second read-write transducer servo-writing a product servo pattern to the opposing surface of the second magnetic disk medium.

18. The data storage library of claim 17, wherein the one or more sequences of instructions, when executed by the one or more processors, cause further performance of:
while the second read-write transducer is servo-positioning from the product servo pattern from the surface of the second magnetic disk medium, the second read-write transducer writing user data to the surface of the second magnetic disk medium.

19. The data storage library of claim 17, wherein:
at least one disk handling mechanism is further configured to remove the second magnetic disk medium from the disk spindle and removably secure a third magnetic disk medium, of the plurality of magnetic disk media, to the disk spindle;
the one or more sequences of instructions, when executed by the one or more processors, cause further performance of:
after the third magnetic disk medium is secured to the disk spindle over the first magnetic disk medium, while the first read-write transducer is servo-positioning from the master servo pattern from the first magnetic disk medium, the second read-write transducer servo-writing a product servo pattern, based on the master servo pattern, to the third magnetic disk medium.

* * * * *